US008848998B1

(12) United States Patent
Muradyan

(10) Patent No.: US 8,848,998 B1
(45) Date of Patent: Sep. 30, 2014

(54) AUTOMATED METHOD FOR CONTRAST MEDIA ARRIVAL DETECTION FOR DYNAMIC CONTRAST ENHANCED MRI

(75) Inventor: Naira Muradyan, Bethesda, MD (US)

(73) Assignee: iCad, Inc., Nashua, NH (US)

( * ) Notice: Subject to any disclaimer, the term of this patent is extended or adjusted under 35 U.S.C. 154(b) by 496 days.

(21) Appl. No.: 12/797,934

(22) Filed: Jun. 10, 2010

(51) Int. Cl.
*G06K 9/00* (2006.01)

(52) U.S. Cl.
USPC .......................................................... 382/131

(58) Field of Classification Search
USPC .................. 382/128, 131, 279, 282; 600/420
See application file for complete search history.

(56) References Cited

U.S. PATENT DOCUMENTS

| | | | |
|---|---|---|---|
| 6,584,216 B1 * | 6/2003 | Nyul et al. ..................... | 382/131 |
| 6,597,937 B2 * | 7/2003 | Liu et al. ........................ | 600/420 |
| 6,647,283 B2 | 11/2003 | Klotz | |
| 7,233,687 B2 | 6/2007 | Ashton | |
| 7,333,845 B2 | 2/2008 | Hundley et al. | |
| 7,346,202 B1 | 3/2008 | Schneider | |
| 7,583,992 B2 * | 9/2009 | Mistretta et al. ............... | 600/420 |
| 7,587,077 B2 | 9/2009 | Schneider | |
| 7,768,652 B2 * | 8/2010 | Everett ........................... | 356/497 |
| 8,180,126 B2 * | 5/2012 | Safdar et al. ................... | 382/128 |
| 8,326,400 B2 * | 12/2012 | Taxt et al. ...................... | 600/420 |
| 2007/0216909 A1 * | 9/2007 | Everett et al. .................. | 356/479 |
| 2008/0304728 A1 | 12/2008 | Licato et al. | |
| 2009/0046908 A1 * | 2/2009 | Safdar et al. ................... | 382/128 |
| 2010/0128946 A1 * | 5/2010 | Fidrich et al. ................. | 382/131 |
| 2011/0194746 A1 * | 8/2011 | Riederer ........................ | 382/131 |
| 2011/0206250 A1 * | 8/2011 | McGinnis et al. ............. | 382/128 |

OTHER PUBLICATIONS

Rijpkema, et al., "Method for Quantitative Mapping of Dynamic MRI Contrast Agent Uptake in Human Tumors", "Journal of Magnetic Resonance Imaging", 2001, pp. 457-463, vol. 14, Publisher: Wiley-Liss, Inc., Published in: US.

* cited by examiner

*Primary Examiner* — Elaine Gort
*Assistant Examiner* — Edward Winston, III
(74) *Attorney, Agent, or Firm* — Loginov & Associates, PLLC; William A. Loginov

(57) ABSTRACT

This invention provides an automated system and method for determining contrast media arrival in vessels near tissues of interest that have been imaged using a predetermined imaging system that produces a plurality of temporally phased images. The system and method reliably distinguishes between actual contrast arrival and potential false positives that can render basic automated techniques inoperable or unreliable. In an illustrative embodiment, the system and method for determining a contrast arrival phase in a plurality of temporal phases of a medical image dataset of tissue includes an image pre-processor or process that, for each of at least a subset of the temporal phases of the medical image dataset, with at least a subset of the signal intensity values respectively in each of the temporal phases, computes signal intensity frequency distributions. An arrival phase analysis processor or process then determines the contrast arrival phase as a function of a relative change in the signal intensity frequency distributions between each of the temporal phases. The signal intensity frequency distributions can be characterized as histograms in an illustrative embodiment. The arrival phase can further be used for setting proper parameters in which to post-process temporally phased images using various methods for tissue perfusion analysis.

23 Claims, 8 Drawing Sheets

AUTOMATED METHOD FOR CONTRAST MEDIA ARRIVAL DETECTION FOR DYNAMIC CONTRAST ENHANCED MRI

FIELD OF THE INVENTION

This application relates generally to the processing of time-resolved medical images, during the acquisition of which a signal-enhancing contrast media is administered. More particularly, this application relates to techniques for detecting the arrival of signal-enhancing contrast media in time-resolved medical images.

BACKGROUND OF THE INVENTION

Early detection of disease or malignant tissue can lead to a better prognosis. The development of non-invasive methods for detection and characterization of tumors and other anomalies has an extreme importance in current medicine. Dynamic, contrast-enhanced imaging provides an effective means of monitoring non-invasively and with high spatial and/or temporal resolutions the microvascular properties of tumors and tissues. The increased permeability of tumor vasculature gives rise to increased leakage of tracers including contrast agents, and enables characterization of enhancement patterns in the tissue. One method for characterization of tumor microvasculature is dynamic, contrast-enhanced (DCE) magnetic resonance imaging (MRI), or DCE-MRI. For DCE-MRI, multi-slice images are typically acquired before, during, and after the contrast agent infusion, resulting in the acquisition of a time sequence of image volumes, also referred to as a dynamic, contrast-enhanced image dataset.

Dynamic, contrast-enhanced image datasets can be post-processed using image analysis software to create supplemental data for interpretation by a radiologist. Such data can illustrate diagnostically important criterion that can not be evident from the original grayscale images. Examples of such supplemental data can include parametric maps, time-enhancement curve shape estimations, and/or multi-parametric analysis results. Some examples of image post-processing analysis techniques for creating such supplemental data can be seen in *Breast MRI: Fundamentals and Technical Aspects*, Hendrick, R. Edward, 2008, XVI, pp. 171-186 and US Published Patent Application No. 2009/0190806, entitled "METHOD FOR TRACKING OF CONTRAST ENHANCEMENT PATTERN FOR PHARMACOKINETIC AND PARAMETRIC ANALYSIS IN FAST-ENHANCING TISSUES USING HIGH-RESOLUTION MRI," the contents of which are fully incorporated herein by way of useful background information.

Many image post-processing analysis techniques require identification of the arrival of contrast media administrated via the arterial/capillary system to the organ/tissue of interest. Contrast media arrival can vary widely depending on multiple factors, such as the speed and site of injection, location of organ/tissue in the body, patient blood flow patterns, etc. In many DCE image post-processing analyses, the time moment when contrast media concentration (and therefore, image signal intensity) achieves peak in major blood vessels or arteries close to the tissue/organ of interest signifies a key time point in a time array to be used for image post-processing analysis. In such cases, correct identification of contrast media arrival is required to generate correct diagnostic interpretation data.

In some semi-manual prior art solutions, a human user is required to visually inspect the dataset and provide either seeds or regions in an image from which contrast arrival can be detected. One such example is described, by way of background, in U.S. Pat. No. 7,233,687, entitled SYSTEM AND METHOD FOR IDENTIFYING OPTIMIZED BLOOD SIGNAL IN MEDICAL IMAGES TO ELIMINATE FLOW ARTIFACTS.

Requiring a clinician to perform a manual step on every DCE image dataset for interpretation is less than ideal, particularly in a clinical setting. However, attempts to provide automated solutions for detecting contrast arrival have experienced technical difficulties, due to undesired factors like imaging artifacts and/or patient motion, either of which can create the illusion within the image of enhancing arteries before or after the contrast media actually arrives. An example of this problem is visually illustrated in FIG. 1, which provides a plurality of DCE-MR images 100 particularly showing raw and subtraction images 110, 120 of a scanned prostate (and surrounding muscular tissues/vascular structures), and line graphs 130, 140 of time-signal intensity curves extracted from femoral arterial voxels near the prostate region. In this exemplary depiction, the images and line graphs are generated using the VividLook® post-processing software package available from iCAD, Inc. of Nashua, N.H. Notably, patient motion late in the imaging procedure has created the false illusion of signal enhancement in the femoral artery around the time that the $60^{th}$ dynamic or temporal phase image volume is acquired. This is represented by the "false" peaks 150 and 160 in respective graphs 130 and 140. Thus the most reliable technique for addressing such unpredictable noise, artifacts and misleading factors has been the close monitoring of the procedure data by a human technician, who can apply educated judgment to more-accurately discern real from false information, and act accordingly. Clearly, this adds time and cost to procedures and can give rise to increased errors.

SUMMARY OF THE INVENTION

This invention overcomes the disadvantages of the prior art by providing an automated system and method for determining contrast media arrival in tissue that has been imaged using a predetermined imaging system that produces a plurality of temporally phased images. The system and method reliably distinguishes between actual contrast arrival and potential false positives that can render basic automated techniques inoperable or unreliable.

In an illustrative embodiment, the system and method for determining a contrast arrival phase in a plurality of temporal phases of a medical image dataset of tissue includes an image pre-processor or process that, for each of at least a subset of the temporal phases of the medical image dataset, with at least a subset of the signal intensity values respectively in each of the temporal phases, computes signal intensity frequency distributions. An arrival phase analysis processor or process then determines the contrast arrival phase as a function of a relative change in the signal intensity frequency distributions between each of the temporal phases. The signal intensity frequency distributions can be characterized as histograms in an illustrative embodiment. The contrast arrival phase information can be displayed on a display or output device and/or stored on a storage device for further handling at a subsequent time. In general, the field of view of the image includes one or more blood vessels that are adjacent or local with respect to the organ/tissue of interest. It is assumed that arrival of the contrast media within the vessels (which can enhance more clearly) is relatively close temporally to its arrival within the organ/tissue.

In an embodiment, the system and method can be constructed and arranged to (a) post-process at least a subset of the temporal phases of the medical image dataset, wherein the post-processed subset is dynamically determined at runtime based on the contrast arrival phase, and (b) output a result of the post-processing to an output device that outputs data to a user. The system and method can also provide a global arrival processor or process that dynamically selects the subset of temporal phases during runtime based on a global arrival measurement. The global arrival measurement can be based upon changes in average intensity between pre-contrast temporal phases and post-contrast temporal phases of the medical image dataset. In addition, the system and method can illustratively provide a voxel signal enhancement processor or process that dynamically selects the subset of the signal intensity values during runtime based on temporal enhancement statistics of voxels that define the medical image dataset. In particular, the voxel signal enhancement processor can be constructed and arranged to derive temporal enhancement statistics from either of, or both of, a smoothed peak phase and a non-smoothed (or original) peak phase. The signal intensity frequency distributions can also illustratively comprise peak phase voxel signal intensities.

In an illustrative embodiment, the arrival phase analysis processor determines the contrast arrival phase based on the relative change in the frequency of signal intensity values that is distributed above a threshold. This threshold can be dynamically set at runtime based on the signal intensity frequency distribution of at least one pre-contrast temporal phase. The arrival phase processor can be constructed and arranged to illustratively determine the contrast arrival phase based on the relative change in right/positive skewness of the signal intensity frequency distributions.

In the embodiments herein the system the medical image dataset is acquired by either of, or both of, a magnetic resonance imaging (MRI) scanner and a computed tomography (CT) scanner. Other types of equivalent and similarly operative scanning devices that have the ability to detect and enhance certain tissues can also be employed to generate the image dataset. More generally, the tissue can comprise a prostate region, a breast, a gland, an internal organ, or any other tissue from which an image can be acquired.

BRIEF DESCRIPTION OF THE DRAWINGS

The invention description below refers to the accompanying drawings, of which.

DETAILED DESCRIPTION

In the present disclosure, the terms "pixels" and "voxels" can be used interchangeably to refer to an element in an image. Image data is generally represented in units of picture elements (pixels). A pixel generally refers to the information stored for a single grid in an image or a basic unit of the composition of an image, usually in a two-dimensional space, for example, x-y coordinate system. Pixels can become volumetric pixels or "voxels" in three-dimensional space (x, y, z coordinates) by the addition of at least a third dimension, often specified as a z-coordinate. A voxel thus refers to a unit of volume corresponding to the basic element in an image that corresponds to the unit of volume of the tissue being scanned. It should be appreciated that this disclosure can utilize pixels, voxels and any other unit representations of an image to achieve the desired objectives presented herein. Both pixels and voxels each contain a discrete intensity and/or color, which is typically defined as one or more digital values within a given range (for example, a grayscale intensity between 0 and 255, or discrete RGB values each between 0 and 255).

As used herein, the terms "dataset" or "image dataset" are employed interchangeably to refer to a plurality of images, a volume of images, a plurality of volumes, or even a plurality of datasets. By way of example, as introduced in the background of the disclosure, in dynamic, contrast-enhanced magnetic resonance imaging (DCE-MRI), a plurality of slice images is typically acquired before, during, and after contrast agent infusion, resulting in the acquisition of a time sequence of image volumes. In this imaging, "dataset" or "image dataset" are used to refer to a plurality of slice images of the tissue at a given time point, a plurality of slices images of the tissue across different time points, or a plurality of image volumes of the tissue across a plurality of discrete time points.

Figure 2:
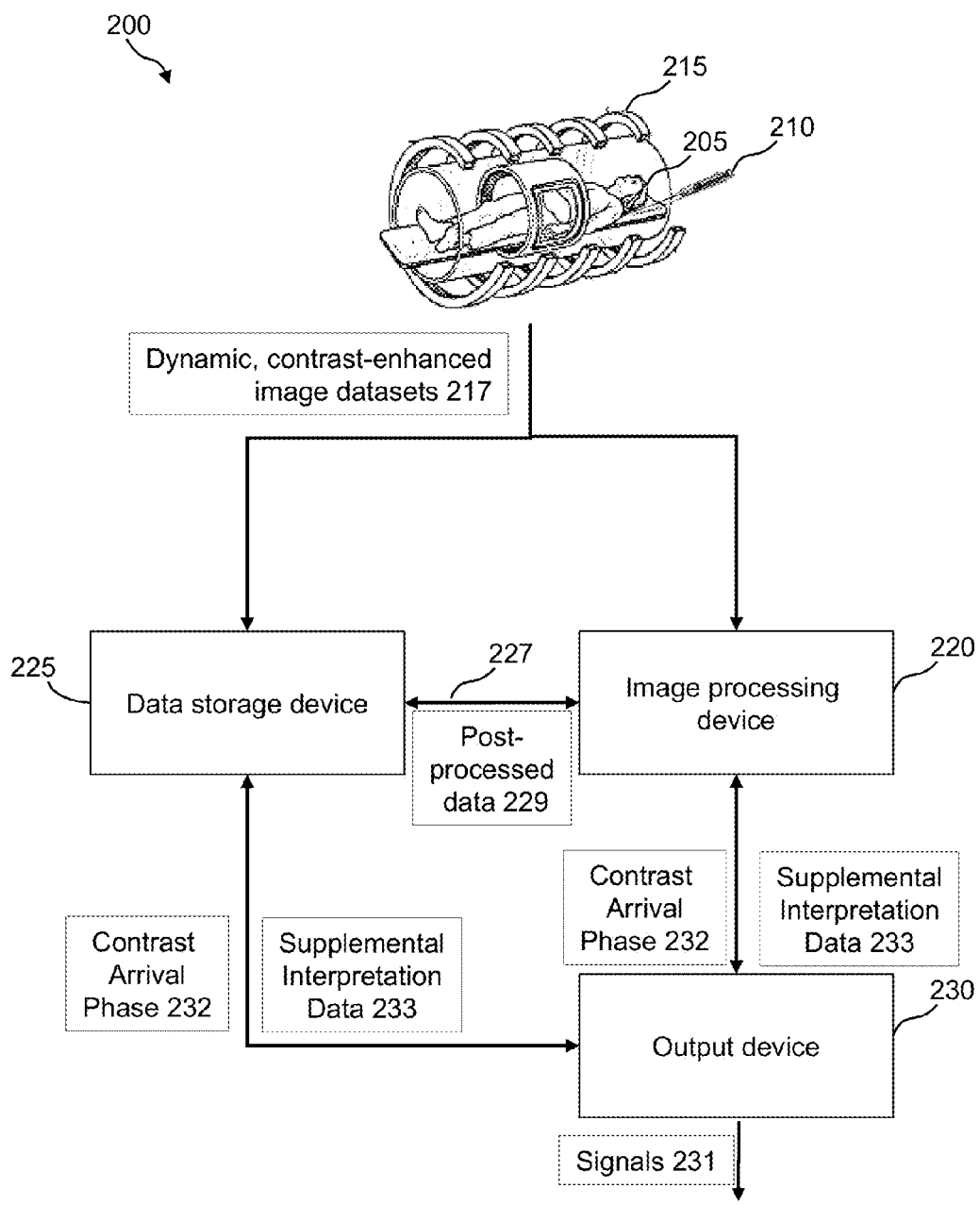
FIG. 2 is a block diagram of a medical examination system that employs an image processing device and corresponding image processing procedures in accordance with an illustrative embodiment.

With reference to FIG. 2, there is shown a block diagram of components of a medical examination system 200 according to an illustrative embodiment of this invention. The medical examination system can be utilized for assessing the health of a patient 205 by monitoring, using medical imaging technology, tissue of the patient before, during, and after the administration of a contrast medium 210. By way of non-limiting examples, the tissue to be monitored can be an organ or organs, such as a breast or breasts, a lung or lungs, or a prostate of the patient. The contrast medium can be any media or agent useful in monitoring blood flow and/or tissue perfusion patterns such as, but not limited to, a gadolinium-based contrast agent. The contrast medium can be administered to the patient by intravenous injection, or another suitable infusion technique.

A magnetic resonance imaging (MRI) scanner 215 can be utilized for acquiring static anatomical or functional datasets, such as dynamic contrast-enhanced image datasets 217 of tissues using conventional or novel magnetic resonance imaging techniques. Alternatively, other dynamic image acquisition techniques can be used, in which case scanners employing different imaging technology such as, but not limited to, computed tomography (CT) scanners can be implemented as the image acquisition component of the medical examination system 200. In general, the results of such scanning include a stream of discrete image datasets (typically contrast-enhanced) acquired at predetermined time intervals defined by "dynamic" or "temporal" phases. For purposes of this disclosure, the datasets include both the tissue to be monitored as well as nearby blood vessels (e.g., arteries), both of which are within the field of view.

The MRI scanner 215 can be coupled to an image processing device 220, such as a computer workstation, a computer server, or another device capable of performing image processing in accordance with an illustrative embodiment. The image processing device can include or comprise the console for controlling and acquiring images from the MRI scanner, where such console is capable of executing program instructions in the form of a computer-readable medium and/or contains hardware for carrying out the processes of the illustrative embodiment. Alternatively, the console can be deployed as part a device separate from the image processing device and operatively connected thereto by appropriate network interconnections. By way of one example (not shown in FIG. 2), the MRI scanner 215 can include or comprise the console and the dynamic, contrast-enhanced image datasets 217 acquired by the scanner can be transmitted via the console to the image processing device for post-processing, which is described in further detail below.

The MRI scanner 215 can also be coupled to a data storage device 225 for storing the dynamic, contrast-enhanced image datasets 217. By way of one non-limiting example, the storage device can be a Picture Archiving and Communication System (PACS) for storing, retrieving, and distributing medical image data between components of the medical examination system 200. Alternatively, any directly attached or networked storage device with appropriate data organization can be employed to store, and allow retrieval of, the image datasets. For example, the storage device can comprise a removable disk or solid-state storage, a network-attached-storage appliance, a storage area network (SAN) and/or a remote data store accessed by a secure private network, such as a hospital wide area network or a public network. Appropriate layers of encryption can be applied to the transmitted as well as the stored data as required to satisfy various governmental and institutional security requirements. Such encryption techniques should be clear to those of ordinary skill.

In an embodiment, the image processing device 220 and the data storage device 225 are also coupled together (represented by a link 227). This can allow the data storage device to transmit the dynamic, contrast-enhanced image datasets 217 to be post-processed by the image processing device as needed. The image processing device can be further arranged to transmit the results of image post-processing in the form of post-processed data 229 to the storage device for storage for subsequent handling and use. Processes by which such information can be generated by the image processing device will be described in further detail herein below.

Another component of the medical examination system 200 is an output device 230 for outputting signals 231 associated with the dynamic, contrast-enhanced image datasets 217 and/or the post-processed data 229. The output device can comprise a printer, a computer monitor, a series of computer monitors, and/or other suitable signal output devices of conventional or novel design. The signals can be output in the form of raw image data or post-processed image data for visual inspection of the tissue. As shown, the output device might receive post-processed data information in the form of a contrast arrival phase 232 and supplemental image interpretation data 233 such as parametric color maps which, in an automated manner, allows the viewer to accurately visualize and interpret the behaviors of the enhancing tissue. Exemplary processes by which the image processing device 220 generates the data for display/reporting by the output device is now described in further detail.

It is expressly contemplated that components of the medical examination system 200 can connect to, and communicate, with each other via one or more of any type or combination of types of communication interfaces, including but not limited to physical interfaces, network interfaces, software interfaces, and the like. The communication can be by means of a physical connection, or can be wireless, optical, or by other means. Alternatively, image datasets can be transmitted indirectly by use of transportable storage devices (not shown in FIG. 2) such as but not limited to compact discs (CDs), digital video discs (DVDs), or solid state "flash" drives, in which case readers for said transportable storage devices can function as communication interfaces of the system.

Figure 3:
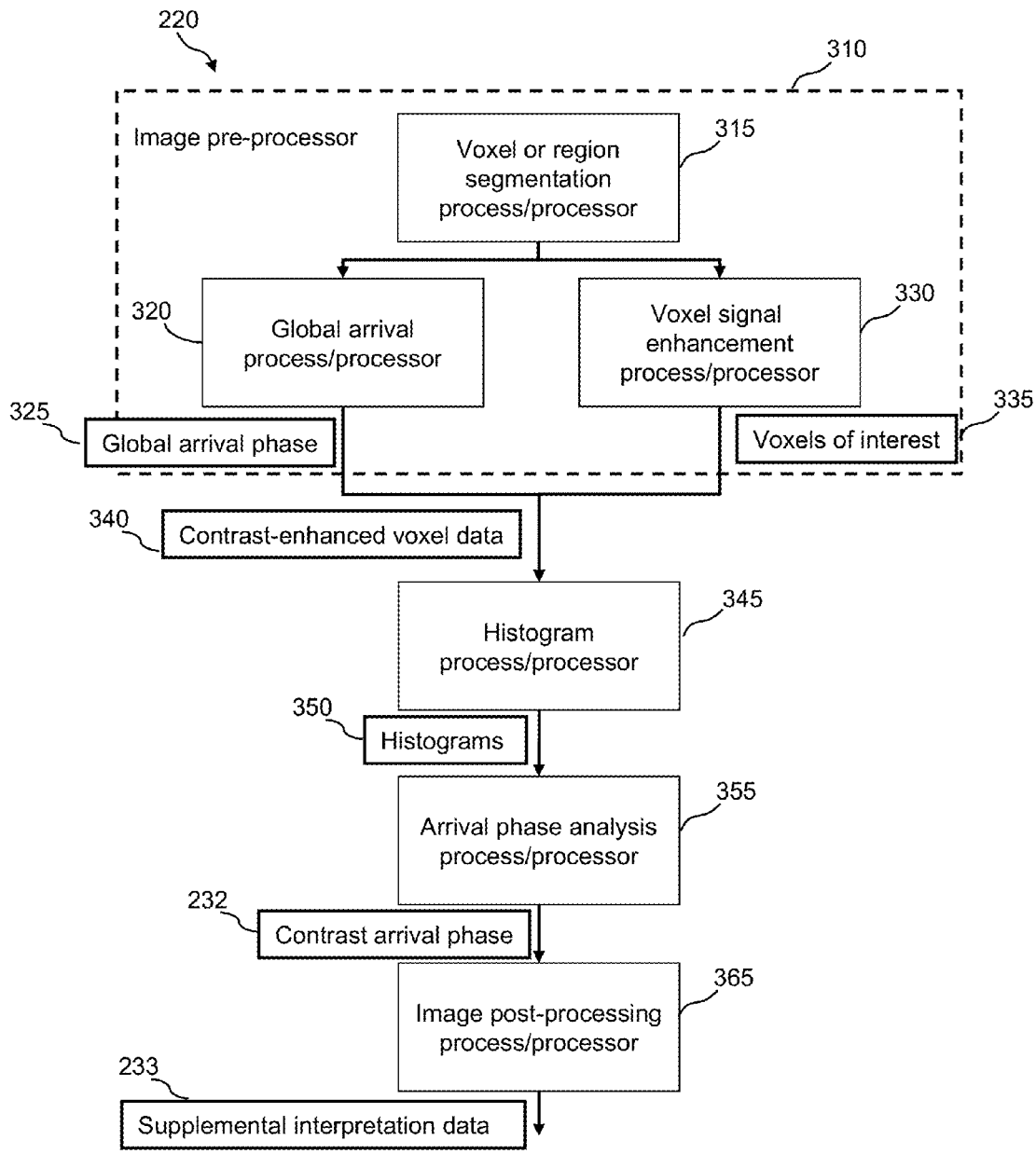
FIG. 3 is a block diagram of an illustrative embodiment of an image processing device for use in the medical examination system of FIG. 2.

Reference is now made to the structural and functional overview of the system and method shown in FIG. 3. Processor blocks shown within the image processing device 220 illustrate different image processing functions that can be performed on the dynamic, contrast-enhanced image datasets 217. Such functions can be realized by suitable combinations of hardware and software components of the image processing device such as, but not necessarily limited to, microprocessors, digital signal processors (DSPs), field-programmable gate arrays (FPGAs), main memories, secondary/auxiliary memories, input/output devices, operating system software, application software, etc. Any such functions, either entirely or in part, can be further implemented on a computer-readable medium/media that can be read by the image processing device 220 to achieve the desired objectives presented herein. Note that while the process functions herein are assigned to discrete processor blocks by way of illustration, it is expressly contemplated that functions of various blocks can be consolidated, expanded to further processor blocks or reordered between blocks as appropriate to carry out the overall process described herein. Note that while the process functions herein are assigned to discrete processor blocks by way of illustration, it is expressly contemplated that functions of various blocks can be consolidated, expanded to further processor blocks or reordered between blocks as appropriate to carry out the overall process described herein. More generally, such structures and/or functions are herein referred to as "process/processor" as they can be implemented as physical processing structures and/or as functions within a more general processing device, such as a general purpose computer or other software-instruction processing unit.

In an embodiment, the image processing device 220 contains an image pre-processor 310, which prepares the dynamic, contrast-enhanced image datasets 217 for additional post-processing. Because contrast-enhanced image datasets usually have larger field of view than the desired tissue/organ of interest, a voxel or region segmentation process using the depicted processor 315 can be performed on the image data, which either includes or excludes specific voxel and/or region image data in further post-processing. For example, an anatomical organ (e.g., a prostate) or organs (e.g., right, left breasts) to be post-processed can be segmented from other tissues/organs (e.g., heart) and/or the background (e.g., air, noise) of the image. By way of another example, noisy pixel data to be excluded from further post-processing can be segmented. Numerous pre-processing techniques that can be implemented as part of the voxel or region segmentation process/processor are shown and described, by way of example, in US Published Patent Application No. 2007/0165927, entitled "AUTOMATED METHODS FOR PRE-SELECTION OF VOXELS AND IMPLEMENTATION OF PHARMACOKINETIC AND PARAMETRIC ANALYSIS FOR DYNAMIC CONTRAST ENHANCED MRI AND CT," the teachings of which are incorporated herein by reference as useful background information.

In an embodiment, the image processing device 220 contains a global arrival process/processor 320 in communication with the voxel or region segmentation process/processor that identifies a global arrival phase 325 from the contrast-enhanced image data. The "global arrival phase" can be defined as a dynamic phase of the dataset in which the contrast media has arrived in the tissues to be monitored, causing the tissues to enhance. Dynamic phases that temporally lead up to the global arrival phase represent candidate arrival phases (i.e., phases in which the contrast would be expected to arrive in the vasculature around the tissues to be monitored without yet causing the tissues themselves to enhance). The image processing device can utilize the computed global arrival phase as a cutoff point; that is, image data up to the global arrival phase can be further processed and image data acquired thereafter need not be further processed to automatically detect the arrival phase, as doing so could lead to erroneous arrival phase results and/or require unnecessary computation time.

In an embodiment, a voxel signal enhancement processor/process 330 is also provided in communication with the voxel or region segmentation process/processor to further include or exclude specific voxel and/or region image data from post-processing. The voxel signal enhancement processor studies signal intensity enhancement characteristics (e.g., percent enhancement ratios). Illustratively, image data for post-processing includes only the voxels of interest 335 with significant signal intensity enhancement characteristics, which targets true enhancing tissues. Such characteristics can be derived from signal intensity values relative to all dynamic phases of the data. In an alternate configuration (not shown in FIG. 3), the voxel signal enhancement processor 330 can receive the computed global arrival phase 325 and use this parameter as input so as to restrict enhancement studies to the signal intensity values prior to global arrival.

To summarize, in the embodiment shown and described in FIG. 3, the image pre-processor 310 pre-selects (i.e., sorts) contrast-enhanced voxel data 340 to be further analyzed/processed by the image processing device 220 for automatic contrast arrival detection. In this embodiment, the contrast-enhanced voxel data is selected both temporally and spatially from the dataset.

In an embodiment, a histogram process/processor 345 receives the contrast-enhanced voxel data 340 from the image pre-processor 310. The histogram processor characterizes the distribution of signal intensity values in each dynamic phase by generating a resulting histogram. By way of background, histograms are frequency distributions; the value in each histogram bin or cell describes the observed frequency of the corresponding intensity value in the contrast-enhanced data. In this embodiment, dynamic phase histograms 350 are derived from the signal intensity values of voxels according to the contrast-enhanced voxel data.

The histograms 350 are provided to an arrival phase analysis process/processor 355, which automatically detects the contrast arrival phase 232 based on an analysis of the change in frequency distributions of signal intensity values across dynamic phases. In an illustrative embodiment, contrast arrival is detected where there is a large increase in signal intensity frequencies between the tails of the dynamic phase histograms. An alternate way of describing this signature refers to the change in amount of right or positive skewness between the dynamic phase histograms.

In an illustrative embodiment, the detected contrast arrival phase 232 is then input as a parameter to an image post-processing process/processor 365, which can compute the supplemental data 233 of use in interpreting the dynamic contrast-enhanced datasets. The supplemental data can then be stored or provided to a human user of the medical examination system, such as a radiologist, via the output device 230 or other mechanism suitable for conveying information. In one embodiment, the contrast arrival phase 232 is a parameter that corresponds to a time moment $t_0$ corresponding to the first post-contrast image in the dataset whose signal intensity values should be evaluated as part of a time array for tissue perfusion analysis by the image post-processing process/processor. Variability in contrast media administration and/or arrival during dynamic imaging can be accounted for with the illustrative, fully automated system and method, providing an improvement in the consistency with which supplemental interpretation data can be generated in spite of such variability.

The image post-processing process/processor 365 illustratively analyzes the time array using, for example, a pharmacokinetic model process/processor (not illustrated in FIG. 3) for computing physiological property values of the tissues. There are numerous pharmacokinetic models known to those of skill in the art. In this illustrative embodiment, the image post-processing process/processor generates a parametric color map from a multi-parametric lookup table of the computed physiological property values. Examples of such illustrative processes are shown and described, by way of example, in US Published Patent Application No. 2009/0190806, entitled "METHOD FOR TRACKING OF CONTRAST ENHANCEMENT PATTERN FOR PHARMACOKINETIC AND PARAMETRIC ANALYSIS IN FAST-ENHANCING TISSUES USING HIGH-RESOLUTION MRI," the teachings of which are incorporated herein by reference as useful background information. However, in other embodiments of the disclosure, the image post-processing process/processor can employ and/or comprise other image post-processing analysis techniques. Other contemplated embodiments include, without limitation, an image post-processing process/processor that computes enhancement parameters (e.g., degree of enhancement, degree of washout, time to peak, slope) from signal intensity values of a discrete set of dynamic phases.

Again with reference to FIG. 2, it is expressly contemplated that the medical examination system 200 can enable a user to input and store contrast administration/arrival assumptions as default parameters (e.g., in a main or auxiliary memory). In such configurations, arrival parameters computed by the image processing device 220 are illustratively compared against the stored default parameters and used in the post-processing of a dataset if they deviate from the default parametric assumptions.

It is also expressly contemplated that the medical examination system 200 can return a null contrast arrival phase for cases exhibiting little to no enhancement. According to one embodiment, a null contrast arrival phase can be determined when the voxel signal enhancement processor/process 330 fails to return a satisfactory number of voxels of interest 335. In such cases, the null contrast arrival phase can be arranged to indicate no, or insignificantly little, contrast agent injection in the body. This outcome can occur in clinical practice due to mistakes, injector or vein-clearance problems during imaging. A null contrast arrival phase enables the image processing device 220 to forego additional image post-processing on such cases. Instead, the medical examination system can display (e.g., via output device 230) the null contrast arrival phase condition, providing the clinician with valuable information that can suggest the patient needs to be re-imaged. According to a prior approach, such null contrast outcomes are post-processed by the image processing device, regardless of their lack of desired image data, thereby taking up valuable processing time, and requiring the clinician to manually identify the no, or insignificantly little, contrast agent condition from the imagery. According to the illustrative embodiment, the processing overhead is reduced in the case of null-contrast outcomes and clinician's need not invest diagnostic resources in reviewing them.

Figure 1:
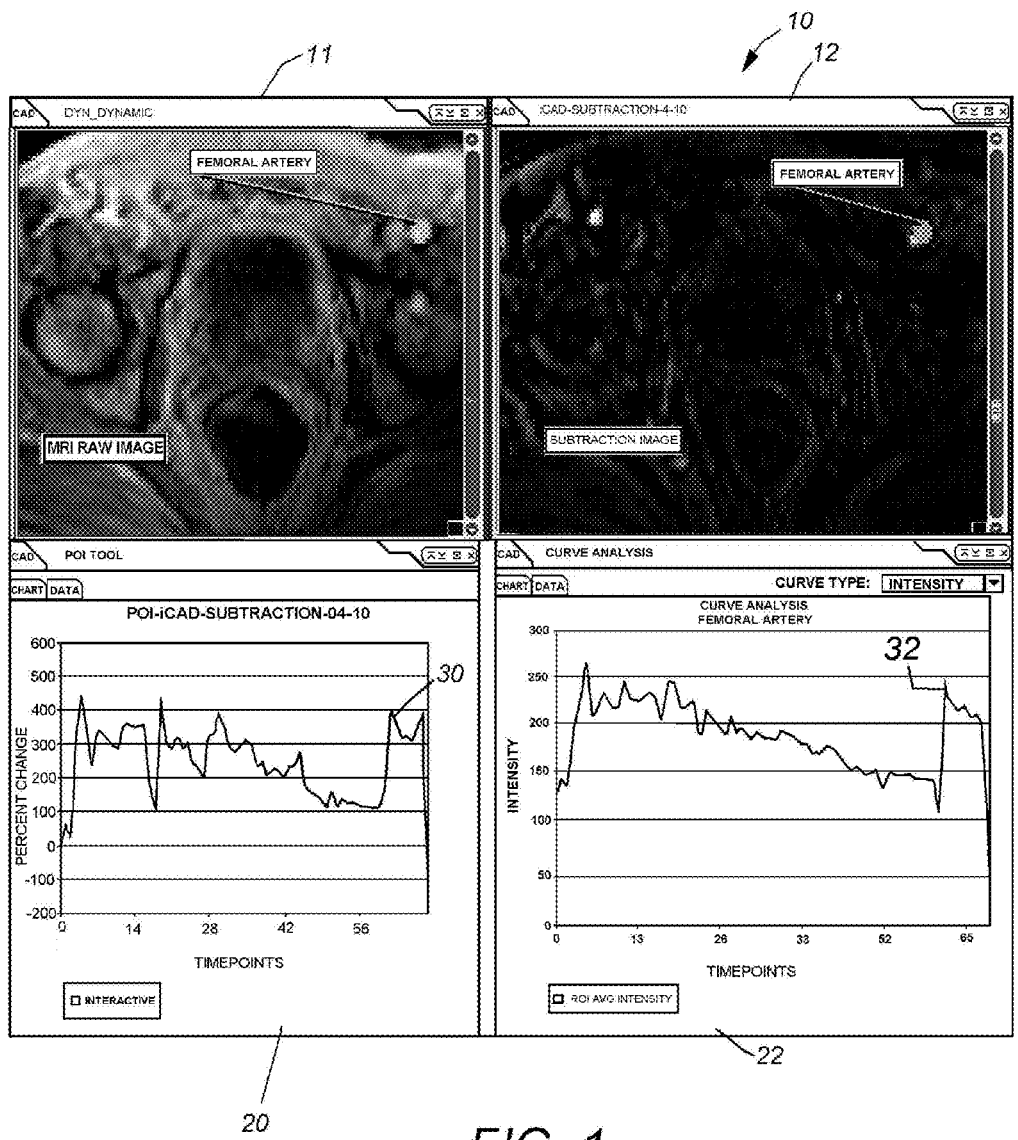
FIG. 1, already described, illustrates a plurality of dynamic, contrast-enhanced magnetic resonance (DCE-MR) images and signal intensity data with respect to an exemplary prostate region.
Figure 4:
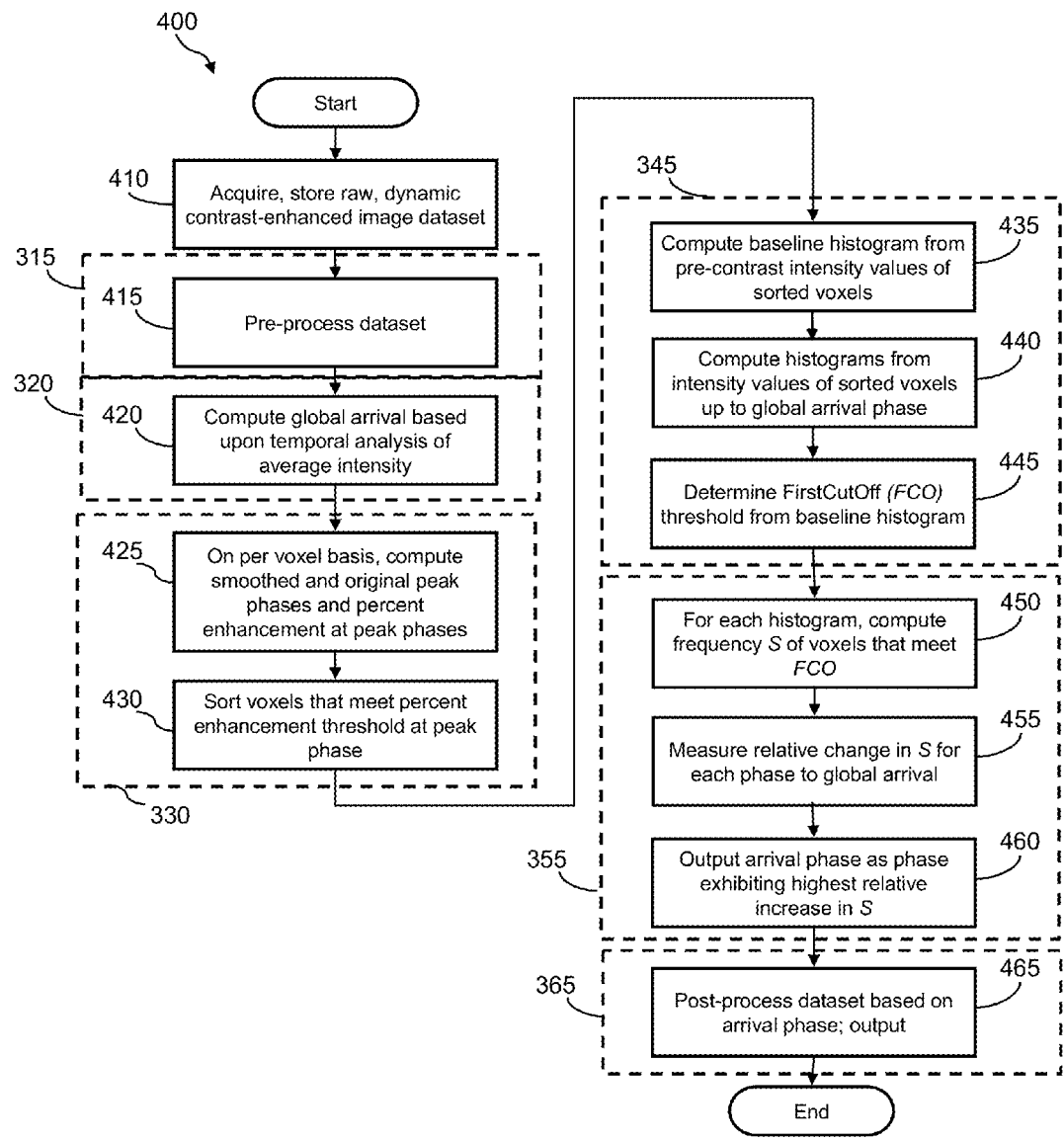
FIG. 4 is a runtime flow chart showing an illustrative automatic contrast arrival detection procedure for use with the image processing device of FIG. 3.

With further reference to FIG. 4 and with continuing reference to FIGS. 1-3, an automatic contrast arrival detection procedure 400 is now described in further detail. The various process steps in the procedure have been grouped by dash-line boxes into corresponding process/processors as described above with reference to FIG. 3, and associated reference numbers have been provided for each dashed-line box. It should be noted that the depicted steps can be arranged alternatively so that they are performed within a different process/processor or performed in a discrete process/processor other than those described in FIG. 3.

In operation, dynamic, contrast-enhanced image data for processing is acquired, stored, and loaded from memory at step 410. The data comprises voxel signal intensity values of an organ or tissue of interest before contrast agent administration, such image(s) or data referred to as baseline/pre-contrast image(s) or data; and additional voxel signal intensity values of the organ or tissue of interest as the agent flows throughout the body and to the organ or tissue of interest, such images or data referred to as post-contrast images or data. Once the dynamic, contrast-enhanced image data is loaded, it can be optionally pre-processed at step 415. Such pre-processing can be performed by voxel or region segmentation process/processor 315 in an illustrative embodiment. Other types of image pre-processing could also be performed.

Once the contrast-enhanced image data to be further post-processed has been established, a global arrival phase is identified from the data at step 420. Such steps can be performed by global arrival process/processor 320 in an illustrative embodiment. The global arrival phase can be identified in contrast-enhanced image data by temporally analyzing increases in average signal intensity with respect to pre-contrast/baseline dynamic phase(s). For purposes of this description, measures of average signal intensity can be referred to as AvgInt.

In one implementation, AvgInt at a given dynamic phase t can be computed according to the formula:

$$AvgInt^t = \sum_{x=1}^{Nx} \sum_{y=1}^{Ny} \sum_{z=1}^{Nz} (I_{xyz}(t)/Nz) \quad \text{(Eq. 1)}$$

where x,y,z span the 3 dimensional data being processed (Nx, Ny, Nz being the amount of voxels in 3-dimensions) and $I_{xyz}(t)$ is the intensity of the corresponding voxel at dynamic phase t.

According to one exemplary dataset of contrast-enhanced images of the prostate, it has been identified that, in general, the contrast agent will have already arrived in the prostate tissues once the AvgInt of a dynamic phase has risen by at least 15% over the AvgInt of a pre-contrast dynamic phase. For purposes of this description, the increase cutoff parameter can be referred to as $N_{AV}$. In illustrative embodiments, $N_{AV}$ can be optimized for any variety of experimental conditions, such as, without limitation, the tissue under evaluation. Although a default $N_{AV}$ parameter can be provided, the $N_{AV}$ parameter can also be customized by a system user prior to runtime execution. This can be accomplished using, for example, a value input by the user during setup or by inputting the type of tissue or body region being imaged, which sets the value for $N_{AV}$ using a look-up table with associated values (for various tissue types or regions), or by executing a predetermined formula/algorithm that empirically computes the value for the tissue type or region.

Figure 5:
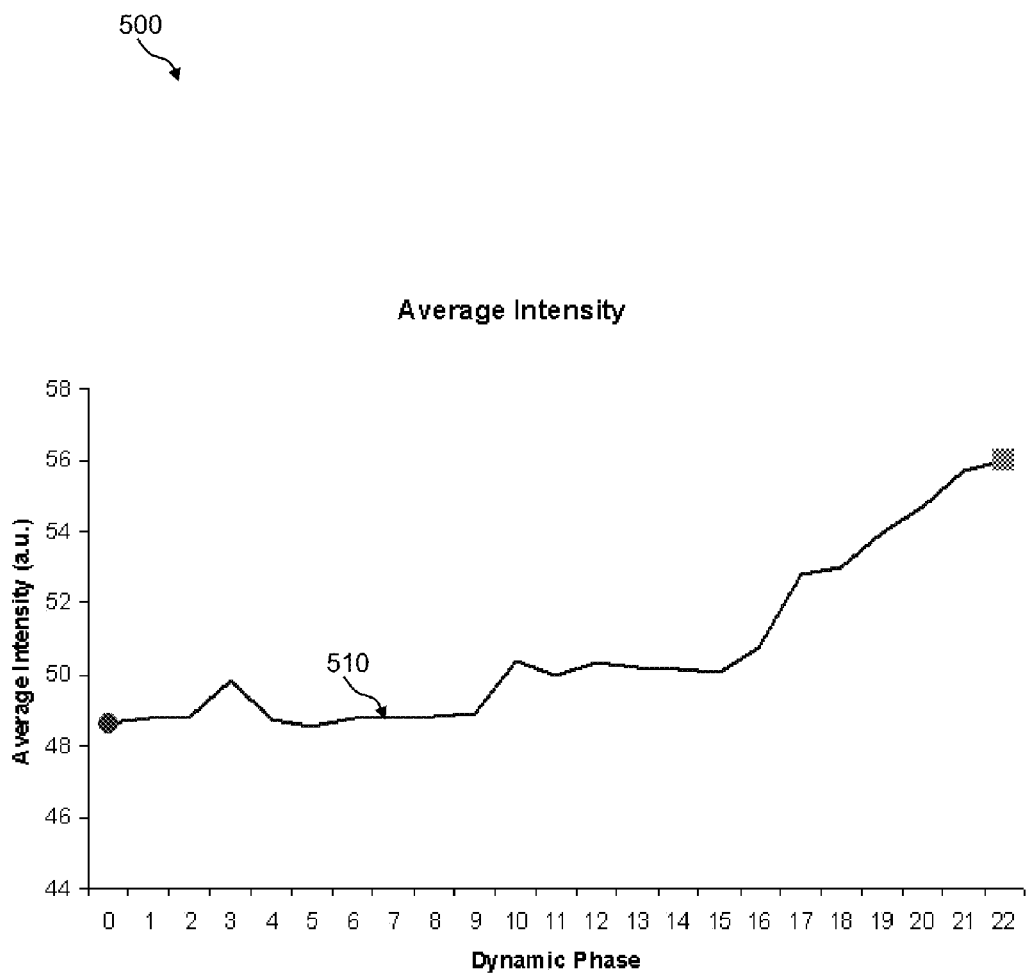
FIG. 5 is a line graph illustrating a curve of average intensity versus dynamic phase derived from an exemplary contrast-enhanced medical image dataset.

In order to further describe the behavior of the system parameters during system runtime, reference is now made to line chart 500 in FIG. 5. A curve 510 of the average intensity of an exemplary contrast-enhanced medical image dataset versus dynamic phase is illustrated. It is observed that the average global signal intensity temporally increases as the contrast media flows into the tissues. In this dataset, dynamic phase 22 represents the global arrival phase. The exemplary dataset contains a total of nearly 100 dynamic phases, with those generally subsequent to the global arrival phase being omitted due to the lack of relevance to these phases to the arrival and for computational efficiencies.

Again referencing the contrast arrival detection procedure 400 of FIG. 4, voxels of interest that should be included in further contrast arrival detection analysis are illustratively pre-selected from the data at steps 425 and 430. Such steps can be performed by voxel signal enhancement process/processor 330 or within another appropriate functional block or processing structure. In accordance with step 425, for each voxel in the data under analysis, the maximum signal intensity value of the voxel is identified in an illustrative embodiment. The dynamic phase at which this occurs is herein referred to as the voxel's "original peak phase" (OPP). The voxel's maximum signal intensity value can then be compared against its baseline/pre-contrast signal intensity value to derive a "percent enhancement" (PE) in step 430. Only voxels exhibiting a minimum PE can be included as part of the voxels of interest. A minimum PE threshold parameter of 80% can be used, for example. A rule for further sorting voxels that meet the minimum PE threshold involves comparing the voxel's signal intensity values after the peak phase against the voxel's baseline/pre-contrast signal intensity value. Only those voxels whose post-peak signal intensity values are not exceeded by the baseline/pre-contrast signal intensity value can be used, for example.

Notably, some voxels can exhibit random peaks that provide an illusion of true enhancing tissues. This can lead to false indications of contrast arrival and the associated dynamic phases leading up to global arrival. To address this potential occurrence, in an illustrative embodiment, the temporal signal intensity curves of voxels of interest are smoothed. Any appropriate smoothing technique can be used. Linear smoothing is one such exemplary technique that can be implemented in accordance with conventional techniques. The smoothed maximum signal intensity value of the voxel can then be identified. The dynamic phase at which this occurs can be referred to as the voxel's "smoothed peak phase" (SPP). The voxel's smoothed maximum signal intensity value can then be compared against its smoothed baseline/pre-contrast signal intensity value to derive a "smoothed percent enhancement" (SPE). Voxels exhibiting a minimum SPE are illustratively included as part of the voxels of interest. A minimum SPE threshold parameter of 70% can be used, by way of example. The SPE parameter can be optimized based on factors such as the temporal resolution of the data. A rule for further sorting voxels of interest can be that the voxel's non-smoothed and smoothed peak phases must be the same (or nearly the same).

Other curve-selection techniques such as a gamma variate analysis or a principal component analysis (PCA) can also be employed to sort voxels of interest in accordance with steps that should be clear to those of ordinary skill.

Referring further to the procedure 400 of FIG. 4, at steps 435 and 440, histograms of signal intensities are computed for each dynamic phase from the baseline phase to the global arrival phase. As shown, the histogram processing can be performed by histogram process/processor 345 in an illustrative embodiment.

In accordance with the illustrative step 435, a baseline/pre-contrast histogram is created from the signal intensity values of the voxels of interest before contrast agent administration. For purposes of this description, the baseline histogram can be referred to as Histogram$^B$. In illustrative embodiments, Histogram$^B$ can be derived from the signal intensity values of voxels of interest in a singular pre-contrast/baseline dynamic phase image or, alternatively, by way of some combination (e.g., averaged) signal intensity values of a plurality of pre-contrast/baseline dynamic phase images. In some imaging procedures, multiple pre-contrast dynamic phase images might be acquired before contrast agent administration. Parameters, such as injection start or number of baseline images, can be specified by a system user during image acquisition and used to identify the signal intensity values before contrast agent administration.

At step 440, histograms are also developed from the signal intensity values of voxels of interest in each dynamic phase after contrast agent administration and until global arrival. As an alternative to forming histograms using the signal intensity values of all voxels in the dynamic phases, it can be desirable to form histograms using only the signal intensity values associated with the computed OPP/SPP of voxels. In this embodiment, each histogram characterizes the observed frequency distribution only of peak phase voxel intensity values at a given dynamic phase. This can be advantageous because signal intensity statistics of artifacts are further sorted out from the histograms, leaving a higher percentage of signal intensity statistics of enhancing arterial tissues.

With further reference to the contrast arrival detection procedure 400 of FIG. 4, based on baseline/pre-contrast frequency distributions of intensity values, a baseline/pre-contrast threshold value is illustratively established at step 445 within the histogram process/processor 345. Such an intensity threshold is herein referred to as the "FirstCutOff" (FCO). FCO intensity can be set from Histogram$^B$ according to the formula:

$$\sum_{FCO=MAX(i)}^{Max^B} \text{Histogram}^B(i) \geq N_{FCO} \quad \text{(Eq. 2)}$$

whereby Max$^B$ represents the voxel with highest intensity value at baseline B, such that there are no more than $N_{FCO}$ amount of voxels in the pre-contrast/baseline dataset with intensities above FCO value. $N_{FCO}$ can be a combination of, or a percentage based on, a total number of voxels Nx×Ny× Nz or a it can be a fixed number based on any appropriate metric, including experimental results using different values for $N_{FCO}$ (for example, $N_{FCO}$=200)

Figure 6:
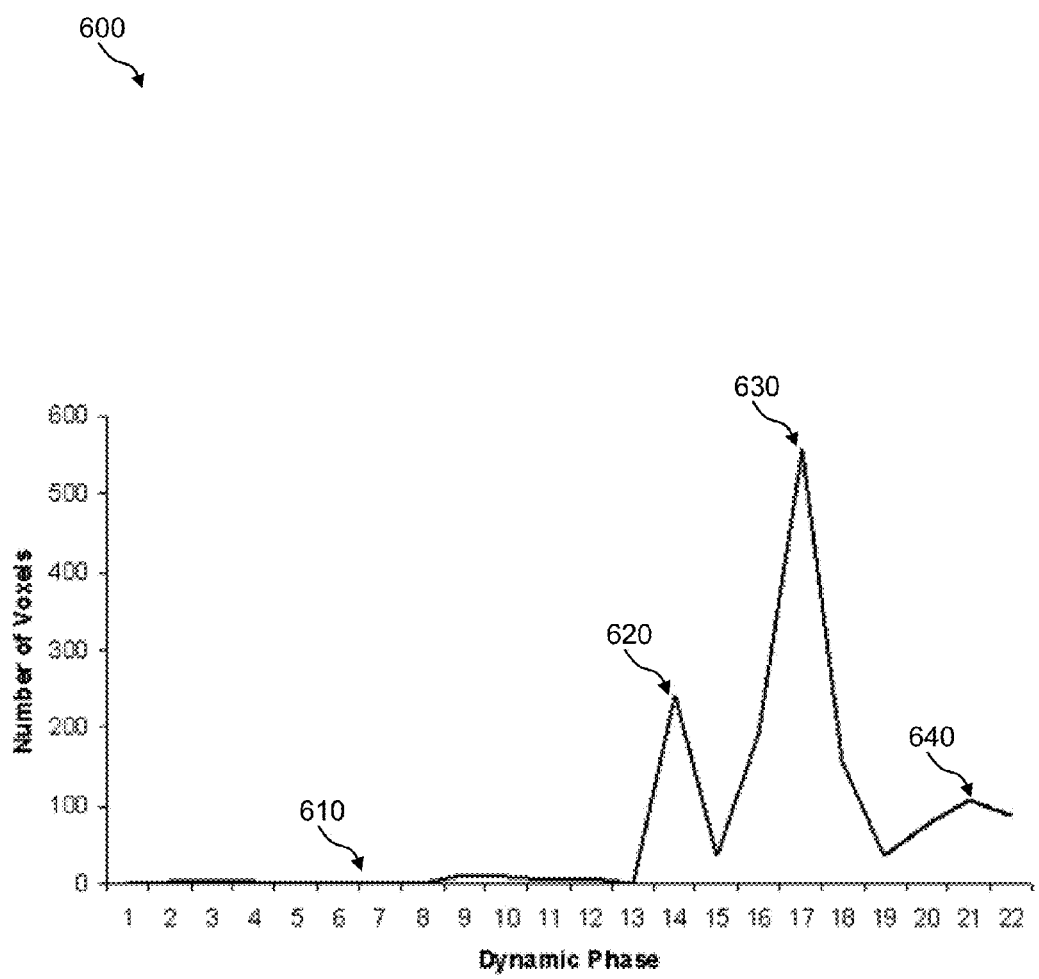
FIG. 6 is a line graph illustrating a curve of signal intensity frequency measurements derived from dynamic phases of the exemplary contrast-enhanced medical image dataset of FIG. 5.

At step 450, in the illustrative arrival phase analysis processor/processor 355, for each dynamic phase histogram, each signal intensity value in the histogram is illustratively compared against intensity threshold FCO. A frequency or count S of the voxels with intensities greater than or equal to FCO can be tallied and stored. To further illustrate the voxel count at various phases, FIG. 6 shows a line graph 600 that illustrates a plot 610 of S by dynamic phase as computed from an exemplary dataset. Within this plot, there are three distinct peaks 620, 630, and 640. The peak 620 represents the arterial contrast arrival phase and the taller peak 630 represents a maximum voxel count that is, in fact, higher than that present at contrast arrival corresponding to prostatic tissues in this example. As global arrival approaches, a significantly smaller peak 640 appears around phase 21. The system and method is adapted to ensure that the first, arterial peak 620 is identified accurately and that no false prior peaks or subsequent tissue peaks are identified as contrast arrival phase.

At step 455 in FIG. 4, relative changes in S across dynamic phases are then measured according to an embodiment. In an illustrative embodiment, a measure of the relative change in S for each dynamic phase t with respect to the previous dynamic phase t−1 can be computed according to the equation:

$$\frac{S^t - S^{t-1}}{S^{t-1} + 1} \quad \text{(Eq. 3)}$$

Figure 7:
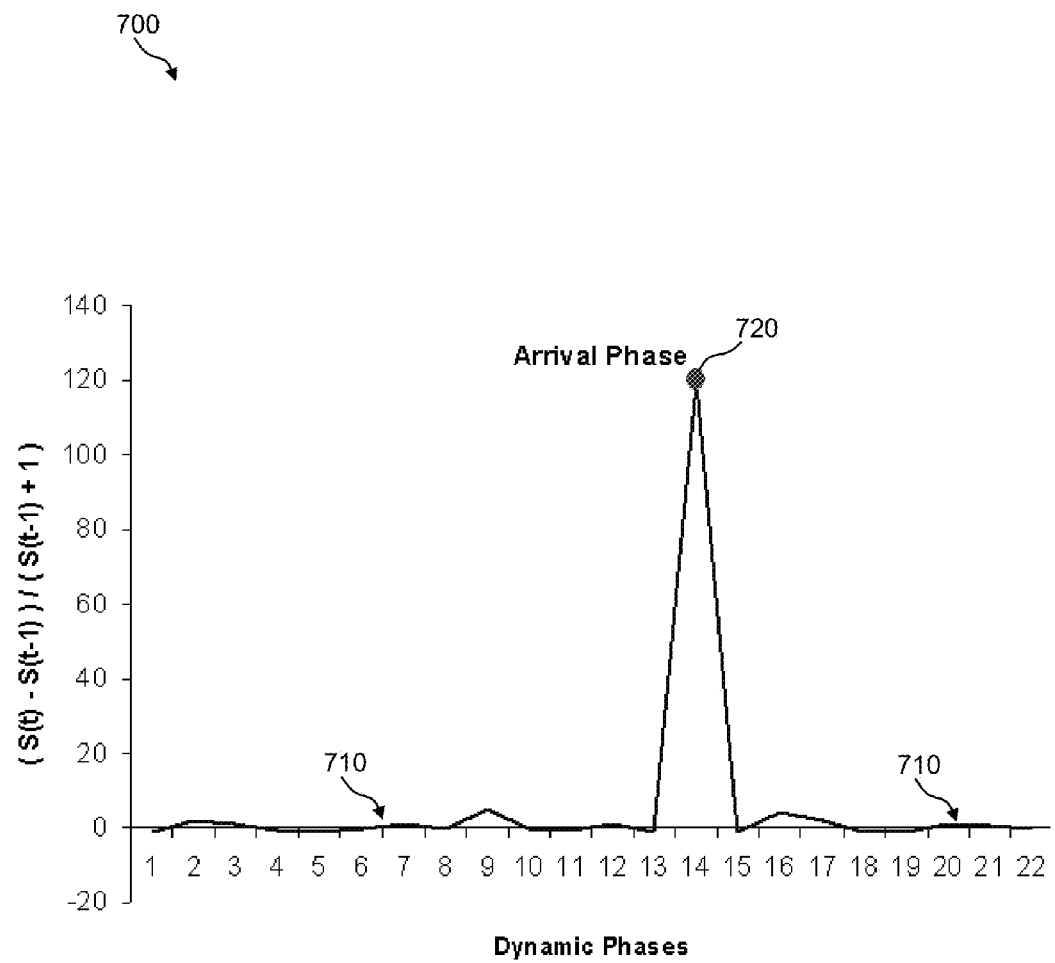
FIG. 7 is a line graph illustrating a curve of temporal signal intensity frequency change measurements derived from dynamic phases of the exemplary contrast-enhanced medical image dataset of FIG. 5.

FIG. 7 shows a line graph 700 that illustrates a plot 710 of the relative temporal change in S by dynamic phase computed for an exemplary dataset. As shown, the contrast arrival phase labeled as "Arrival Phase" can be seen as exhibiting a large solitary spike (peak 720) in relative change or a maximum gradient/rate of increase of S. In an exemplary embodiment, at step 460, CA Arrival Phase is computed between baseline B and GlobalArrival phases by the illustrative arrival phase analysis process/processor 355 according to the equation:

$$CA \text{ Arrival Phase} = t \underset{t \in (B \div GlobalArrival)}{\text{Maximum}} \left( \frac{S^t - S^{t-1}}{S^{t-1} + 1} \right) \quad \text{(Eq. 4)}$$

In the procedure 400 of FIG. 4, at step 465, the contrast media arrival phase can be used to automatically set input parameters to further post-processing according to a variety of novel and/or conventional techniques. As shown, the post-processing can be performed by image post-processing process/processor 365 in an illustrative embodiment. This has the advantage of rendering the overall system free of a need for human interaction until creation and output of the supplemental interpretation data. Alternatively, computed contrast media arrival parameter(s) can also be output to a human user (e.g., via output device 230), which has the advantage of allowing the user to review the automatic contrast arrival detection results prior to initiation of additional post-processing. A clinician might desire this manual step regardless of the accuracy of the automated contrast arrival detection scheme presented herein.

Figure 8:
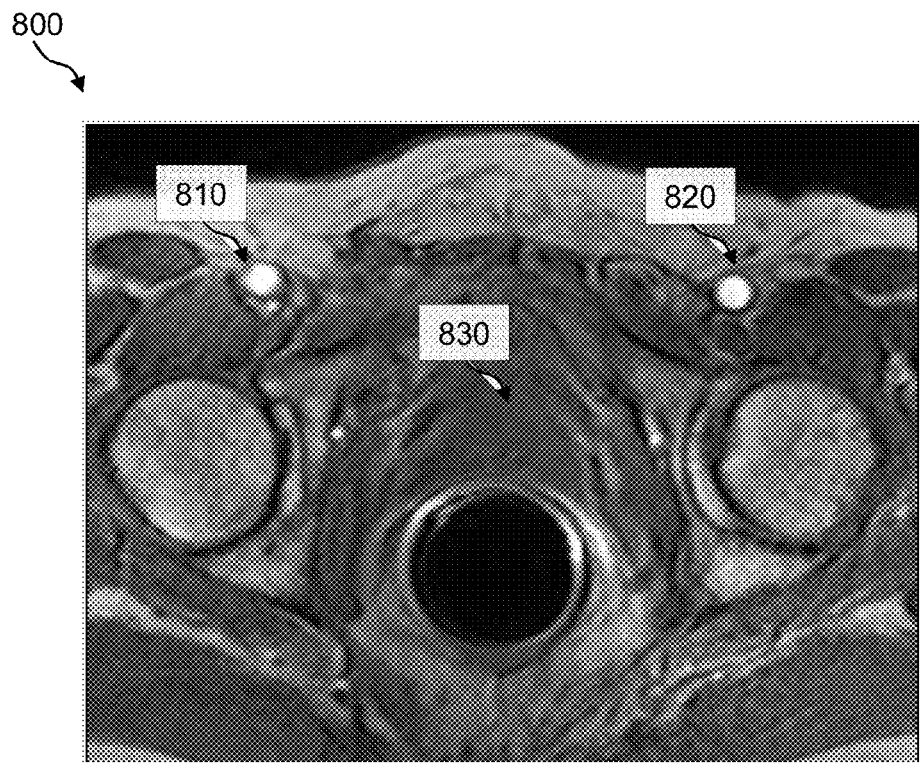
FIG. 8 is an exemplary DCE-MR image of a body region containing a prostate and surrounding muscular tissues/vascular structures at the approximate time of contrast arrival, thereby rendering the image of use as part of a time array for an automated, post-processing analysis in accordance with an illustrative embodiment.

An example of a contrast arrival phase image is visually illustrated in FIG. 8, which provides an image slice 800 of a scanned prostate (and surrounding muscular tissues/vascular structures) at the dynamic arrival phase. In this image, the femoral arteries 810 and 820 are enhanced with contrast agent, while the prostate 830 has yet to exhibit any signal enhancement from contrast. This arrival image, as well as images corresponding to subsequent dynamic phases in which the prostate does enhance with contrast, make excellent candidates for further analysis of the prostate tissue. In accordance with an illustrative embodiment, this image can be automatically flagged by the system using the processes described hereinabove as an image of interest based upon its state of contrast arrival.

Supplemental image interpretation data can be stored (e.g., via data storage device 225) or output (e.g., via output device 230) to a clinician, one such example being a radiologist. For example, the data can comprise illustrative multi-parameter lookup tables and colored parametric images of the tissue/organ of interest. It is expressly contemplated that other clinically relevant data can be output instead of or in addition to those examples described herein, and can depend on the particular embodiments of image post-processing analysis performed. The image interpretation data can also be stored in a memory in communication with the medical examination system (e.g., data storage device 225), such that it can be recalled by the clinician and output/manipulated at any later point in time.

Conclusion

It should be clear that the system and method of the illustrative embodiments provide an effective and reliable technique for automatically computing an indication of contrast arrival in a plurality of temporally phased images of a contrast-media-infused tissue or bodily region. The system advantageously detects the contrast arrival in adjacent and/or local blood vessels and can further post-process image datasets using predictable assumptions that tissues of interest perfuse with contrast shortly thereafter. This system and method is robust to artifacts and false peaks that might otherwise cause incorrect contrast arrival indications. This system and method allows temporally phased images to be fully post-processed. Moreover, the system and method of the illustrative embodiment reduces processing and clinical diagnostic overhead by focusing on those phases leading up to global arrival and not the potentially voluminous body of image data that follows this stage.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the system and method of the present invention, what has been described herein is merely illustrative of the application of the principles of the present invention. For example, some or all of the processes described herein can be implemented in hardware, software, including a computer-readable medium of program instructions. Moreover, while images of an anatomical prostate have been presented to illustrate various aspects of the illustrative embodiments, such images should not be construed as limiting the utility of the present invention to any one particular organ, gland or tissue. More generally, while the embodiments described herein relate to MR and CT-type scans, the teachings herein can be applied to any scanning device that generates an image of internal tissue which includes a contrast-enhancing substance (such as, but not limited to, magnetic nanoparticles and other scan-influenced substances). Accordingly, this description is meant to be taken only by way of example, and not to otherwise limit the scope of this invention.

What is claimed is:

1. A computer-implemented method for determining a contrast arrival phase in a plurality of temporal phases of an image of tissue, comprising the steps of:
   establishing in a region of interest, within the image of the tissue, intensity statistics for voxels in each of the plurality of phases;
   receiving a pre-contrast intensity threshold value of the statistics;
   preselecting the voxels within the region of interest based upon temporal enhancement characteristics for each of the voxels;
   computing statistics for predetermined dynamic phases from the preselected voxels;
   determining a cutoff threshold based on the statistics;
   determining by a computer, a relative change in statistics for each of the predetermined dynamic phases with respect to the cutoff threshold by determining the contrast arrival phase as a function of temporal increase in frequency of the preselected voxels having post-contrast signal intensity values that exceed the pre-contrast signal intensity threshold value; and
   reporting the contrast arrival phase to an output device based upon the determined relative change.

2. A computer-implemented method for determining a contrast arrival phase in a plurality of temporal phases of a medical image dataset of tissue, comprising the steps of:
   for each of at least a subset of the temporal phases of the medical image dataset, with at least a subset of the signal intensity values respectively in each of the temporal phases, computing signal intensity frequency distributions; and
   determining the contrast arrival phase as a function of temporal increase in post-contrast signal intensity frequency distributions that exceed a pre-contrast signal intensity frequency distribution threshold value; and
   outputting the contrast arrival phase to an output device.

3. The method of claim 2 further comprising the step of storing the contrast arrival phase in a data storage device.

4. The method of claim 2 further comprising the steps of;
   post-processing at least a subset of the temporal phases of the medical image dataset, wherein the post-processed subset is dynamically determined at runtime based on the contrast arrival phase.

5. The method of claim 2 wherein the subset of temporal phases is dynamically selected during runtime based on a global arrival measurement.

6. The method of claim 2 wherein the subset of the signal intensity values is dynamically selected during runtime based on temporal enhancement statistics of voxels that define the medical image dataset.

7. The method of claim 6 wherein the temporal enhancement statistics are derived from at least one of a smoothed peak phase and a non-smoothed peak phase.

8. The method of claim 2 wherein the signal intensity frequency distributions comprise peak phase voxel signal intensities.

9. The method of claim 2 wherein the contrast arrival phase is determined based on the relative change in right/positive skewness of the signal intensity frequency distributions.

10. The method of claim 2 wherein the medical image dataset is acquired using at least one of a magnetic resonance imaging (MRI) scanner or a computed tomography (CT) scanner.

11. The method of claim 2 wherein the medical image dataset includes image data of one or more vessels within the field of view.

12. A system for determining a contrast arrival phase in a plurality of temporal phases of a medical image dataset of tissue comprising:

an image pre-processor that, for each of at least a subset of the temporal phases of the medical image dataset, with at least a subset of the signal intensity values respectively in each of the temporal phases, computes signal intensity frequency distributions; and an arrival phase analysis processor that determines the contrast arrival phase as a function of temporal increase in post-contrast signal intensity frequency distributions that exceed a pre-contrast signal intensity frequency distribution threshold value.

13. The system of claim 12 further comprising a data storage device that stores the contrast arrival phase.

14. The system of claim 12 further comprising an output device that outputs the contrast arrival phase.

15. The system of claim 12 further comprising an image post-processor constructed and arranged to;

post-process at least a subset of the temporal phases of the medical image dataset, wherein the post-processed subset is dynamically determined at runtime based on the contrast arrival phase, and output a result of the post-processing to an output device that outputs data to a user.

16. The system of claim 12 further comprising a global arrival processor that dynamically selects the subset of temporal phases during runtime based on a global arrival measurement.

17. The system of claim 12 further comprising a voxel signal enhancement processor that dynamically selects the subset of the signal intensity values during runtime based on temporal enhancement statistics of voxels that define the medical image dataset.

18. The system of claim 17 wherein the voxel signal enhancement processor is constructed and arranged to derive temporal enhancement statistics from at least one of a smoothed peak phase and a non-smoothed peak phase.

19. The system of claim 12 wherein the signal intensity frequency distributions comprise peak phase voxel signal intensities.

20. The system of claim 12 wherein the arrival phase processor determines the contrast arrival phase based on the relative change in right/positive skewness of the signal intensity frequency distributions.

21. The system of claim 12 wherein the medical image dataset is acquired by at least one of a magnetic resonance imaging (MRI) scanner and computed tomography (CT) scanner.

22. The system of claim 12 wherein the tissue comprises at least one of a prostate region, a breast, a gland and an internal organ.

23. The system of claim 12 wherein the medical image dataset includes image data of one or more vessels within the field of view.

* * * * *